United States Patent
Cornec et al.

(10) Patent No.: US 6,633,023 B2
(45) Date of Patent: Oct. 14, 2003

(54) INDUCTION HEATING DEVICE FOR HEATING COOKING VESSELS

(75) Inventors: René Cornec, La Chapelle St Mesmin (FR); Didier Gouardo, Saran (FR); Alain Roux, Orléans (FR)

(73) Assignee: Brandt Cooking, St. Jean de la Ruelle (FR)

(*) Notice: Subject to any disclaimer, the term of this patent is extended or adjusted under 35 U.S.C. 154(b) by 80 days.

(21) Appl. No.: 09/813,136

(22) Filed: Mar. 21, 2001

(65) Prior Publication Data

US 2001/0025848 A1 Oct. 4, 2001

(30) Foreign Application Priority Data

Mar. 21, 2000 (FR) .............................. 00 03601

(51) Int. Cl.$^7$ ................................. H05B 6/12
(52) U.S. Cl. ....................... 219/624; 219/626; 219/662; 219/675
(58) Field of Search ................ 219/624, 625, 219/626, 627, 661, 662, 663, 665, 667, 672, 671, 675; 99/DIG. 14

(56) References Cited

U.S. PATENT DOCUMENTS

| 3,704,357 A | * 11/1972 | Moulin ........................ 219/675 |
| 3,843,857 A | * 10/1974 | Cunningham ................ 219/624 |
| 3,989,916 A | * 11/1976 | Amagami et al. ........... 219/624 |
| 5,808,280 A | 9/1998 | Gaspard ...................... 219/624 |

FOREIGN PATENT DOCUMENTS

| EP | 376 760 | * 7/1990 | ................ 219/624 |
| EP | 03203187 | 9/1991 | |
| EP | 0 498 735 A1 | 8/1992 | |

* cited by examiner

*Primary Examiner*—Philip H. Leung
(74) *Attorney, Agent, or Firm*—Young & Thompson

(57) ABSTRACT

An induction heating device for heating cooking vessels includes at least three concentric inductors and implements a step of heating a load. For a load covering at least three inductors, at least one intermediate inductor that is covered and that is determined in such a manner as to homogenize the input of heat to the load is not energized during the heating step. Applications of the device include domestic hot plates.

14 Claims, 2 Drawing Sheets

INDUCTION HEATING DEVICE FOR HEATING COOKING VESSELS

BACKGROUND OF THE INVENTION

1. Field of the Invention

The invention relates to induction heating devices for heating cooking vessels. Several such heating devices are generally combined in a domestic hotplate. Each heating device is intended to heat only one vessel at a time.

2. Description of the Prior Art

The usual kind of hotplate generally includes an induction coil fed by an inverter with current at a high frequency, for example from 20 kHz to 50 kHz. The induction coil is disposed below a support through which the magnetic field produced by the induction coil can pass. Currents are therefore induced in any metal cooking vessel placed on the support. The induced currents heat the cooking vessel, and only the vessel, which is an advantage over hot plates which apply heat by thermal conduction.

However, for maximum efficiency, the size or the diameter of the cooking vessel must be substantially the same as that of the heating or cooking area corresponding to the induction coil. If the cooking vessel is significantly larger than the heating area, induction heating is imperfect because the annular area outside the heating area is then outside the magnetic field produced by the induction coil. If the cooking vessel is significantly smaller than the heating area, the induction coil feeds current to the outside annular portion of the heating area unnecessarily because that outside annular portion does not contribute to the production of induced current to heat the cooking vessel. Once again, the heating of the cooking vessel by induction heating is therefore imperfect. The fact that in this case there is an electrical current in the annular outside portion for which there is no load, i.e. no cooking vessel, has the disadvantage that the annular outside portion generates radio frequency interference.

The combination of the heating area that can be energized by a coil and the corresponding coil is referred to hereinafter as an inductor. The problem with induction heating devices is matching the size of the energized inductor to the size of the load, i.e. the cooking vessel.

Periodic energization on a time-sharing basis of all the inductors covered by the load is known in the art. All the inductors covered by the load are energized successively during each period during the heating step. A disadvantage of this prior art is the noise caused by periodic operation of the switches for feeding the electrical current to one or other of the inductors. Another drawback of this prior art is that the load is not cooked homogeneously.

Simultaneously energizing all of the inductors covered by the load is also known in the art. Each inductor is energized by a separate generator. A disadvantage of this prior art is the cost of the heating device. Another disadvantage of this prior art is that the load is not cooked homogeneously.

One of the problems with the prior art is that the load is not cooked homogeneously. The invention proposes an induction heating device in which the particular manner of energizing the inductors during the heating step goes a long way to solving this problem. Other problems of the prior art, such as noise and cost, for example, are solved by optional additions to or preferred embodiments of the heating device according to the invention.

SUMMARY OF THE INVENTION

The invention provides an induction heating device for heating cooking vessels, the device including at least three concentric inductors and implementing a step of heating a load, wherein, for a load covering at least three inductors, at least one intermediate inductor that is covered and that is determined in such a manner as to homogenize the input of heat to the load is not energized during the heating step.

The invention will be better understood and its other features and advantages will become apparent on reading the following description and referring to the accompanying drawings, which are provided by way of example only.

DETAILED DESCRIPTION OF THE PREFERRED EMBODIMENTS

Figure 1:
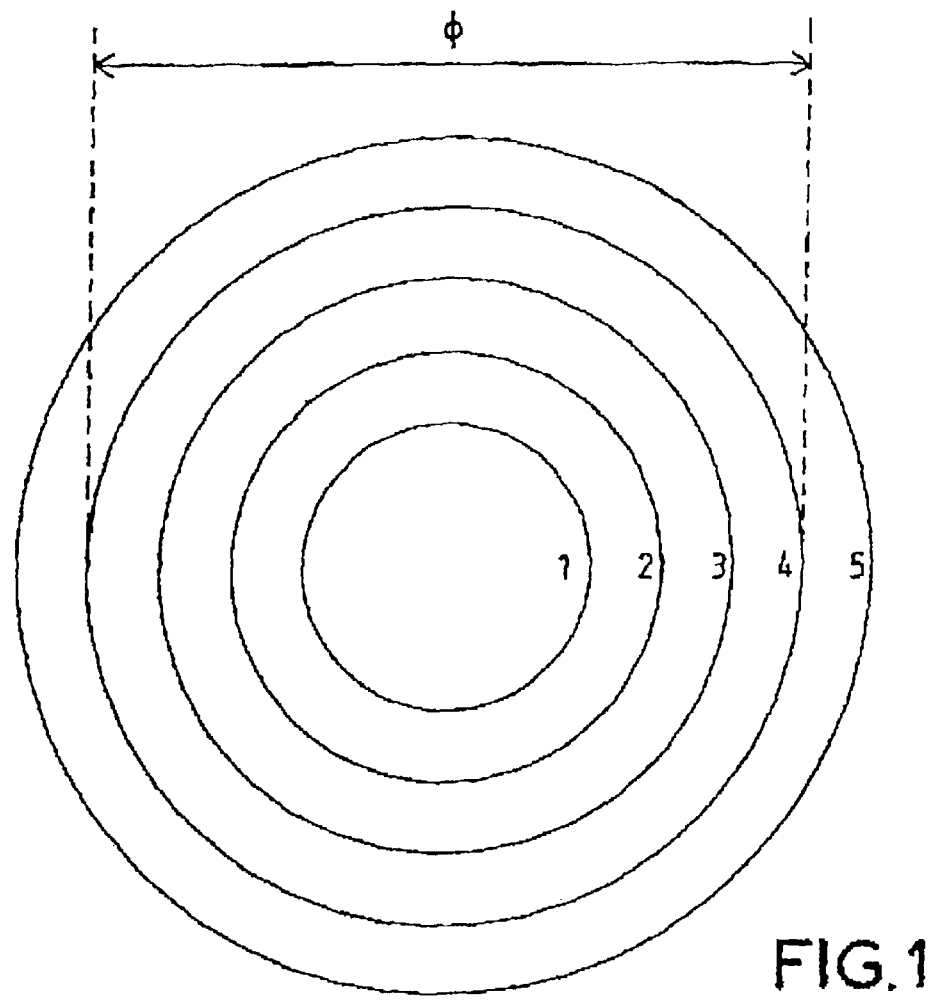
FIG. 1 is a diagram showing one preferred embodiment of a heating device according to the invention.

FIG. 1 is a diagram showing a preferred embodiment of a heating device according to the invention. The heating device includes a plurality of (at least three) concentric inductors. The example shown in FIG. 1 includes five concentric inductors numbered from 1 to 5 from the central inductor 1 toward the outermost peripheral inductor 5. The inductors 2 to 5 are peripheral inductors. The two innermost peripheral inductors are the inductors 2 and 3. The concentric inductors are preferably circular. The diameter Φ shown in FIG. 1 is both the outside diameter of the fourth concentric inductor 4 and the inside diameter of the fifth concentric inductor 5. The concentric inductors can also be elliptical, for example.

The process of heating a cooking vessel includes at least one step of heating the cooking vessel. The cooking vessel, i.e. the load, covers a number of inductors depending on the size of the load. For a relatively large load covering at least three inductors, i.e. at least the central inductor 1 and the two innermost peripheral inductors 2 and 3, one or more inductors covered by the load are not energized, in contradistinction to the prior art. An intermediate inductor is an inductor which is neither the central inductor nor the outermost peripheral inductor; thus in FIG. 1 the intermediate inductors are the inductors 2, 3 and 4.

Assume a load covers the inductors 1 to 4. The central inductor that is covered is still the inductor 1 and the outermost peripheral inductor that is covered becomes the inductor 4; in this case the intermediate inductors that are covered are the inductors 2 and 3.

At least one intermediate inductor that is covered is not energized during the heating step. The or each intermediate inductor that is covered that is not energized during the heating step is determined to homogenize the input of heat to the load, i.e. the fact of not heating it during the step of heating the load makes the input of heat to the load more homogeneous, which makes the cooking or heating of the load more homogeneous. The inductors that are not covered by the load are preferably not energized.

For example, for a load covering the three inductors 1, 2 and 3, the intermediate inductor 2 that is covered is preferably not energized during the heating step.

For example, for a load covering the four inductors 1, 2, 3 and 4, the intermediate inductor 2 that is covered is preferably not energized during the heating step.

For example, for a load covering the five inductors 1, 2, 3, 4 and 5, the intermediate inductors 2 and 4 that are covered are preferably not energized during the heating step.

All the concentric inductors of the heating device according to the invention are preferably electrically connected to the same generator, not shown in FIG. 1. Each heating device according to the invention requires only one generator and is therefore less costly. The generator has a power rating of approximately 2 800 W, for example.

The or each intermediate inductor that is covered and is not energized during the heating step is advantageously determined so that the peaks in the distribution of the magnetic field are as small as possible, to make the distribution of temperature at the bottom of the cooking vessel more homogeneous, even if the thermal conductivity of the metal vessel is not very good.

During the step of heating a load covering both the central inductor and at least two peripheral inductors, the number of inductors covered by the load that are energized is preferably greater than the number of inductors that are not energized and there are preferably neither three consecutive inductors that are energized nor two consecutive inductors that are not energized. This improves the attenuation of the magnetic field peaks at the level of the load and makes the cooking or heating of the load more homogeneous. For example, for a load covering four concentric inductors 1 to 4, to obtain both homogeneous cooking and sufficient heating power, the inductors that are energized can be the inductors 1, 3 and 4. Energizing only inductors 1 and 3 or 1 and 4, for example, would give worse cooking results.

In the case of a load covering both the central inductor and at least two peripheral inductors, the inductors that are covered by the load and that are energized advantageously include at least the central inductor 1 and the outermost peripheral inductor, which helps to cook the load homogeneously.

In accordance with one optional feature of the invention a noticeable annular gap is provided between at least two consecutive inductors. For example, for a heating device like that shown in FIG. 1, the rings 1, 2, 3 and 5 are inductors and the ring 4 is a noticeable annular gap between the second peripheral inductor 3 and the third peripheral inductor 5.

The inductors can be electrically interconnected in various ways. The electrical configurations in accordance with the invention preferably necessitate only configuration switches, i.e. switches whose setting does not change during the step of heating a given cooking vessel.

Figure 2:
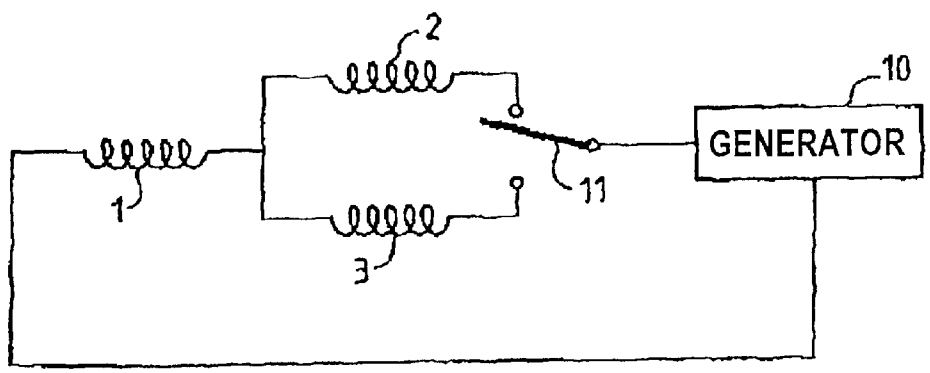
FIGS. 2, 3 and 4 are diagrams showing preferred electrical configurations of inductors of a heating device according to the invention.

The central inductor is preferably connected in series with the combination of the two innermost peripheral inductors, which are advantageously connected to form a T with the central inductor. At least one switch is preferably adapted to prevent the two innermost peripheral inductors being energized simultaneously. FIG. 2 gives one example of an electrical configuration in the case of a heating device that includes only three inductors. The two peripheral inductors 2 and 3 are connected to form a T with the central inductor 1. A generator 10 is connected to a two-position switch 11. In one position of the switch 11 the generator 10 energizes the inductors 2 and 1 and in the other position it energizes the inductors 3 and 1.

If the induction heating device according to the invention includes at least a fourth concentric inductor, which constitutes the third peripheral inductor from the central inductor, the fourth concentric inductor is preferably connected in series with the second peripheral inductor and can be short-circuited, generally by a set of switches.

If the induction heating device according to the invention includes at least a fifth concentric inductor which constitutes the fourth peripheral inductor from the central inductor, the fifth concentric inductor is preferably connected in parallel with the third peripheral inductor and can be short-circuited, generally by a set of switches.

Figure 3:
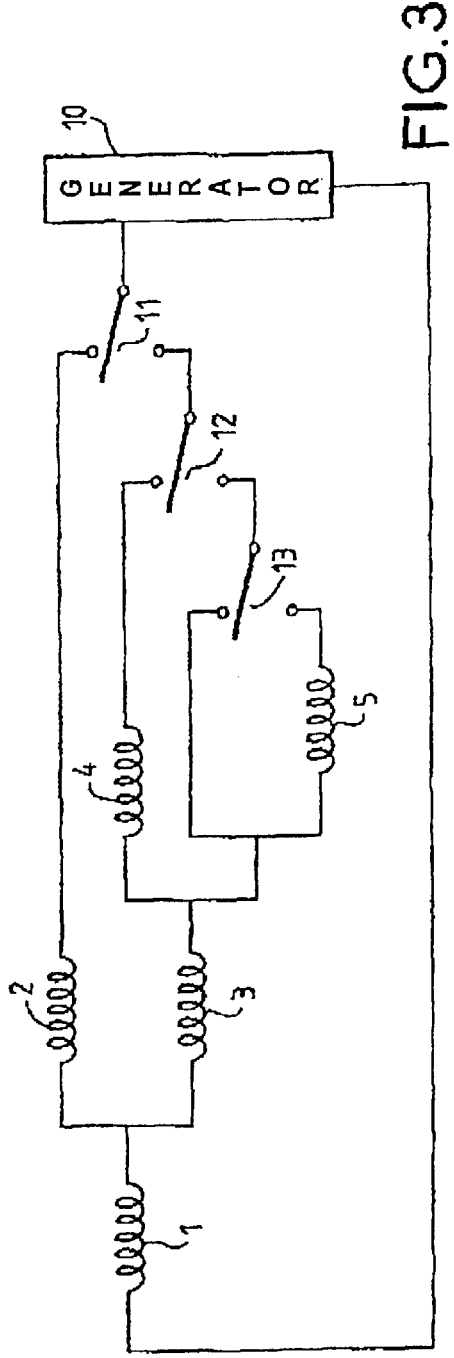

FIG. 3 gives one example of an electrical configuration in the case of a heating device consisting of five concentric inductors. The two peripheral inductors 2 and 3 are connected to form a T with the central inductor 1. A third peripheral inductor 4 and a fourth peripheral inductor 5 are connected in parallel with each other and in series with the second peripheral inductor 3. The peripheral inductors 4 and/or 5 can be short-circuited by operating switches 12 and 13. A generator 10 is connected to a switch 11. The switch 11 prevents simultaneous energization of the inductors 2 and 3. With the heating device shown in FIG. 3, four combinations of simultaneously energized inductors can be chosen to suit the size of the load, as follows: the central inductor 1 and the first peripheral inductor 2; the central inductor 1 and the second peripheral inductor 3; the central inductor 1, the second peripheral inductor 3 and the third peripheral inductor 4; the central inductor 1, the second peripheral inductor 3 and the fourth peripheral inductor 5. Once the combination of inductors corresponding to a given load has been chosen, that combination is retained throughout the step of heating said load.

Figure 4:
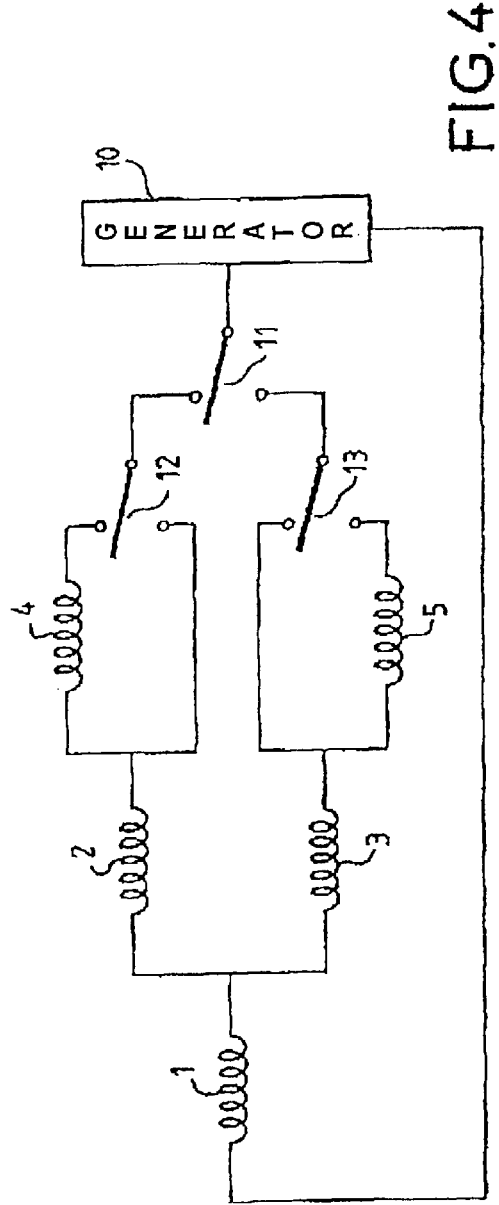

FIG. 4 gives another example of an electrical configuration in the case of a heating device consisting of five concentric inductors. The two peripheral inductors 2 and 3 are connected to form a T with the central inductor 1. A third peripheral inductor 4 is connected in series with the first peripheral inductor 2. A fourth peripheral inductor 5 is connected in series with the second peripheral inductor 3. The peripheral inductors 4 and 5 can be short-circuited by switches 12 and 13, respectively. A generator 10 is connected to a switch 11. The switch 11 prevents simultaneous energization of the inductors 2 and 3. With the heating device shown in FIG. 3, four combinations of simultaneously energized inductors can be chosen to suit the size of the load, as follows: the central inductor 1 and the first peripheral inductor 2; the central inductor 1 and the second peripheral inductor 3; the central inductor 1, the first peripheral inductor 2 and the third peripheral inductor 4; the central inductor 1, the second peripheral inductor 3 and the fourth peripheral inductor 5.

In addition to the step of heating the load, the induction heating device according to the invention preferably implements a step of sensing the load. The step of sensing the load is performed by control means which also advantageously perform the step of heating the load. The step of sensing the load consists of determining if there is a load in front of one or more inductors, and in front of which inductor(s) that load is situated.

The step of sensing a load in front of the inductors preferably includes successively energizing a plurality of sets of inductors, measuring the corresponding energy expended by such energization, and calculating at least one difference between the measured energies, the number of inductors covered by the load sensed being based on the calculated difference or differences. Instead of calculating differences between the measured energies, the measured energies can be directly compared to each other.

In the case of an embodiment of the heating device consisting of three concentric inductors 1, 2 and 3, like that shown in FIG. 2, the step of sensing the load advantageously includes the following phases: first, the inductors 1 and 2 are energized for a given time t during which the energy E(1+2) expended by the energization is measured. Then the inductors 1 and 3 are energized during the same given time t during which the energy E(1+3) expended by the energization is measured. Then the difference Δ between the measured energies E(1+2) and E(1+3) is calculated. If the difference Δ is greater than zero, i.e. if E(1+2)>E(1+3), then the inductors 1 and 2 are energized. If the difference Δ is less than zero, i.e. if E(1+2)<E(1+3), then the inductors 1 and 3 are energized.

Once a combination of inductors to be energized, corresponding to a given type of load, has been determined, that combination is advantageously retained throughout the step of heating said load. This eliminates the problem of noise caused by operation of the switches during the heating step.

The number of concentric inductors is preferably an odd number. The number of concentric inductors is advantageously equal to three; a heating device including three concentric inductors is commonly referred to as a "triple-ring inductor".

The induction heating device according to the invention achieves good cooking results even with poor quality cooking vessels, i.e. cooking vessels of poor thermal conductivity, preventing them from evening out any localized hot spots quickly.

A more homogeneous distribution of the heat input to the load is particularly beneficial if the load, i.e. the cooking vessel, is large. The induction heating device according to the invention is particularly beneficial for heating large pans used to fry meat or fish, for example. The outside diameter of the outermost peripheral inductor is preferably substantially equal to that of a large skillet.

What is claimed is:

1. An induction heating device for heating cooking vessels, said device comprising:
   a source of power;
   at least three concentric inductors that include a central inductor and two innermost peripheral inductors; and
   a switch that is connected between said source of power and said two innermost peripheral inductors that is arranged and adapted to selectively energize only one of said two innermost peripheral inductors when said central inductor is energized.

2. The heating device of claim 1, wherein said source of power is a common generator that is selectively connected to all of said concentric inductors.

3. The heating device of claim 2, wherein one terminal of said switch is connected to said common generator and another terminal of said switch is switchably connected to only one of said two innermost peripheral inductors at a time.

4. The heating device of claim 1, further comprising a sensor that determines which of said concentric inductors are covered by a load, and a controller responsive to said sensor that energizes a majority of said concentric inductors and that ensures that three consecutive ones of said concentric inductors are not energized and that two consecutive ones of said concentric inductors are energized.

5. The heating device of claim 1, further comprising a sensor that determines which of said concentric inductors are covered by a load, and a controller responsive to said sensor that energizes said central inductor and an outermost one of said peripheral inductors that is covered by the load.

6. The heating device of claim 1, wherein said central inductor is connected in series with the combination of said two innermost peripheral inductors which are connected to form a T with said central inductor.

7. The heating device of claim 6, further comprising at least a fourth concentric inductor that is a third peripheral inductor from said central inductor and that is connected in series with said second peripheral inductor, and a further switch arranged to short-circuit said fourth concentric inductor.

8. The heating device of claim 7, further comprising an annular gap between said second peripheral inductor and said third peripheral inductor.

9. The heating device of claim 7, further comprising at least a fifth concentric inductor that is a fourth peripheral inductor from said central inductor and that is connected in parallel with said third peripheral inductor, and a further switch arranged to short-circuit said fifth concentric inductor.

10. The heating device of claim 1, comprising an odd number of said concentric inductors.

11. The heating device of claim 10, comprising only three of said concentric inductors.

12. The heating device of claim 10, comprising only five of said concentric inductors.

13. The heating device of claim 1, further comprising a sensor that determines which of said inductors is covered by a load and a controller that successively energizes a plurality of sets of inductors, measures a corresponding energy expended by said energization, and calculates at least one difference between said measured energies, the number of inductors covered by the sensed load being determined from the calculated difference or differences.

14. An induction heating device for heating cooking vessels, said device comprising:
   at least three concentric inductors;
   control means for controlling said concentric inductors when heating a cooking vessel, wherein when a cooking vessel covers at least three of said concentric inductors, at least one intermediate inductor that is covered is not energized by said control means,
   means for sensing which of said concentric inductors is covered by a cooking vessel,
   wherein said means for sensing is further for successively energizing a plurality of sets of said concentric inductors, measuring the corresponding energy expended by said energization, and calculating at least one difference between said measured energies, the number of inductors covered by the sensed load being determined from the calculated difference or differences.

* * * * *